United States Patent
Nishii et al.

(10) Patent No.: US 6,513,884 B2
(45) Date of Patent: Feb. 4, 2003

(54) HYDRAULIC BRAKE APPARATUS FOR A VEHICLE

(75) Inventors: Michiharu Nishii, Toyota (JP); Satoshi Ishida, Chiryu (JP); Masaki Oishi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/948,584

(22) Filed: Sep. 10, 2001

(65) Prior Publication Data

US 2002/0033641 A1 Mar. 21, 2002

(30) Foreign Application Priority Data

Sep. 19, 2000 (JP) ........................................ 2000-283538

(51) Int. Cl.$^7$ ................................................ B60T 8/44
(52) U.S. Cl. ................................ 303/114.1; 303/113.3; 303/113.4
(58) Field of Search ........................... 303/122, 122.09, 303/113.3, 113.4, 114.1, 114.2, 115.1, 115.4, 115.5, 116.1, 116.4, 117.1, 119.1

(56) References Cited

U.S. PATENT DOCUMENTS

| | | | |
|---|---|---|---|
| 3,910,645 A | * 10/1975 | Takeuchi et al. | 303/10 |
| 3,942,844 A | * 3/1976 | Inada et al. | 303/114.1 |
| 4,416,491 A | * 11/1983 | Belart et al. | 303/114.1 |
| 4,620,750 A | 11/1986 | Leiber | |
| 4,743,071 A | * 5/1988 | Iwamoto | 188/353 |
| 4,807,942 A | * 2/1989 | Belart | 303/114.1 |
| 4,832,418 A | * 5/1989 | Mattusch | 303/114.1 |
| 4,834,467 A | * 5/1989 | Zirps | 303/114.1 |
| 4,867,509 A | * 9/1989 | Maehara et al. | 303/113.3 |
| 4,900,103 A | * 2/1990 | Stegmaier | 303/114.1 |
| 4,950,027 A | * 8/1990 | Reinartz et al. | 303/113.3 |
| 5,098,172 A | * 3/1992 | Maehara | 188/358 |
| 5,112,115 A | * 5/1992 | Willmann et al. | 188/358 |
| 5,114,215 A | 5/1992 | Benzinger et al. | |
| 5,531,509 A | * 7/1996 | Kellner et al. | 188/358 |
| 6,183,049 B1 | * 2/2001 | Oka et al. | 303/114.1 |
| 6,196,641 B1 | * 3/2001 | Oka et al. | 303/10 |
| 6,273,526 B1 | * 8/2001 | Wachi et al. | 188/356 |

FOREIGN PATENT DOCUMENTS

| | | | | |
|---|---|---|---|---|
| DE | 3439258 | * | 4/1986 | 303/114.1 |
| DE | 3625233 | * | 1/1987 | 303/114.1 |
| DE | 3728298 | * | 3/1989 | 303/114.1 |
| GB | 2194009 | * | 2/1988 | 303/114.1 |

OTHER PUBLICATIONS

New U.S. patent application No. 09/893,403 filed Jun. 29, 2001, corresponding to Japanese Patent Application No. 2000–197968.

* cited by examiner

*Primary Examiner*—Christopher P. Schwartz
*Assistant Examiner*—Devon Kramer
(74) *Attorney, Agent, or Firm*—Burns, Doane, Swecker & Mathis, LLP (57) ABSTRACT

A hydraulic brake apparatus is provided for increasing a braking force with a brake feeling similar to that during a normal brake operation, even if a brake pedal is operated during an automatic brake operation. A valve device having a spool is placed in a power piston and is transferred between first and second positions depending on the operation of the brake pedal. At the first position, a power chamber is at atmospheric pressure level, while at the second position a fluid communication is established between the power chamber and an auxiliary hydraulic pressure source. The spool is driven independent of the operation of the brake pedal. When a hydraulic pressure is applied to the spool, the valve device is switched to the second position, urging the power piston to advance, without transmitting the resultant force to the brake operation member. The driving device, when applied with no hydraulic pressure, retains the valve device at the first position.

16 Claims, 4 Drawing Sheets

HYDRAULIC BRAKE APPARATUS FOR A VEHICLE

The present application is based on and claims priority under 35 U.S.C §119 with respect to Japanese Patent Application No. 2000-283538 filed on Sep. 19, 2000 AD (12th year of Heisei), the entire content of which is incorporated herein by reference.

FIELD OF THE INVENTION

The present invention is generally directed to a hydraulic brake apparatus for a vehicle in which a brake fluid pressure is applied to a wheel cylinder for applying a braking torque to a vehicular road wheel. More particularly, the present invention is directed to a hydraulic brake apparatus for a vehicle which includes, in addition to a master cylinder, an auxiliary hydraulic pressure source and a pressure adjusting regulating device and which is capable of performing an automatic brake operation.

BACKGROUND OF THE INVENTION

As a hydraulic brake apparatus which is capable of performing an automatic brake operation independent of brake pedal depression, various devices are known, as disclosed in, for example, U.S. Pat. No. 4,620,750 (corresponding to a Japanese Patent Application Publication published on Jun. 9, 1984 as Toku-Kai-Sho 59 (1984)-100045), and U.S. Pat. No. 5,114,215 (corresponding to a Japanese Patent Application Publication published on May 29, 1991 as Toku-Kai-Hei 3 (1991)-125658), each of which includes an auxiliary hydraulic pressure source and a pressure adjusting device or a pressure regulating device. These references are difficult to understand. Based only upon illustrations of these references, the device disclosed in each of the references seems to be capable of performing an automatic brake operation by utilizing a hydraulic pressure output from the pressure adjusting device.

However, in each of the aforementioned references, while the automatic brake operation is being continued under which a braking force is applied independent of brake pedal depression, if the driver depresses a brake pedal, a time duration is required for increasing the braking force, thereby hurting the brake pedal feeling. The reason is that in each reference the braking force cannot be increased for a while despite increasing the brake pedal depression since the brake fluid pressure developed during the automatic brake operation is transmitted as a reaction force to the brake pedal. In order to make the time shorter, an extremely large brake pedal depression force is required in a short period of time. In addition, a predetermined amount of time is required in order to detect such a brake pedal depression during an automatic brake operation, which makes it impossible to establish a quick transfer to another control.

Thus, in a hydraulic brake apparatus for a vehicle which includes, in addition to a master cylinder, an auxiliary hydraulic pressure source and a pressure adjusting device for performing an automatic brake operation, a need exists to increase brake fluid pressure and brake pedal feeling even if a brake pedal is depressed during automatic brake operation so that brake pedal feeling is similar to an ordinary brake pedal operation.

SUMMARY OF THE INVENTION

The present invention has been developed to satisfy the request noted above and a first aspect of the present invention provides a hydraulic brake apparatus for a vehicle which comprises:

A master cylinder advances a master piston, depending on an operation of a brake operation member, to increase a pressure of a brake fluid supplied from a brake fluid reservoir. The master cylinder outputs the resultant brake fluid as a brake fluid pressure.

A power piston is placed at a rearward portion of the master piston to define a power chamber. The power piston is advanced by a hydraulic pressure in the power chamber to advance the master piston.

An auxiliary hydraulic pressure source outputs a power hydraulic pressure by increasing the pressure of the brake fluid supplied from the reservoir.

A pressure adjusting device is connected to the auxiliary hydraulic pressure source, is connected to the reservoir to adjust the power hydraulic pressure to a value which is output from the auxiliary hydraulic pressure source, and supplies the adjusted power hydraulic pressure to the power chamber.

The pressure adjusting device includes a valve device and a driving device.

The valve device is provided in the power piston and establishes, depending on at least the operation of the brake operation member, a changeover between a first position at which the power chamber is pressurized to atmospheric pressure and a second position at which the power chamber is brought into fluid communication with the auxiliary hydraulic pressure source.

The driving device hydraulically drives the valve device, independent of the operation of the brake operation member.

The driving device, when applied with hydraulic pressure, switches the valve device to the second position, and urges the power piston to advance, without transmitting the resultant force to the brake operation member. The power piston is advanced against a reaction force to the power piston which results from the hydraulic pressure output from the master cylinder. The driving device, when applied with no hydraulic pressure, retains the valve device at the first position.

A second aspect of the present invention is to provide a hydraulic brake apparatus in which the valve device includes a spool which is movable in the axial direction in the power piston. The power chamber is constructed to be in fluid communication with the auxiliary pressure source and the reservoir when the spool is in advancing and retracting positions, respectively, relative to the power piston. The spool is advanced when the driving device is applied with hydraulic pressure.

A third aspect of the present invention is to provide a hydraulic brake apparatus in which the driving device is in the form of a stepped portion formed at an outer surface of the spool. The stepped portion is constructed such that a rearward side of the stepped portion is capable of receiving a hydraulic pressure in the power piston.

A fourth aspect of the present invention is to provide a hydraulic brake apparatus in which the hydraulic pressure to be applied to the driving device is a hydraulic pressure output from the auxiliary hydraulic pressure source.

A fifth aspect of the present invention is to provide a hydraulic brake apparatus in which an electromagnetic valve device is controlled. The electromagnetic valve device is disposed between the auxiliary hydraulic pressure source and the driving device and regulates the hydraulic pressure to a desired pressure value, which is to be applied to the driving device from the auxiliary hydraulic source.

A sixth aspect of the present invention is to provide a hydraulic brake apparatus in which the master piston and the power piston are accommodated in a cylinder. The cylinder is provided therein with a passage which establishes fluid communication between the power chamber and a pressure chamber defined between the master piston and the power piston. The passage is provided therein with a normally open differential-pressure responsive valve which is closed depending on a pressure increase in the second pressure chamber.

A seventh aspect of the present invention is to provide a hydraulic brake apparatus further including an input member and a reaction rubber disc. The input member is moved in the power piston at a rearward side of the spool for transmitting the operation of the brake operation member to the spool. The reaction rubber disc is disposed in the power piston at a frontward side of the spool for transmitting a reaction force from the master piston to the spool when the brake operation member is operated.

An eighth aspect of the present invention is to provide a hydraulic brake apparatus further including a plunger which is placed between the spool and the reaction rubber disc in a slidable fashion. The plunger is accommodated in a space which is in fluid communication with the reservoir.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Hereinafter, a preferable embodiment of a hydraulic brake apparatus for a vehicle in accordance with the present invention will be described, in detail, with reference to the attached drawings.

Figure 1:
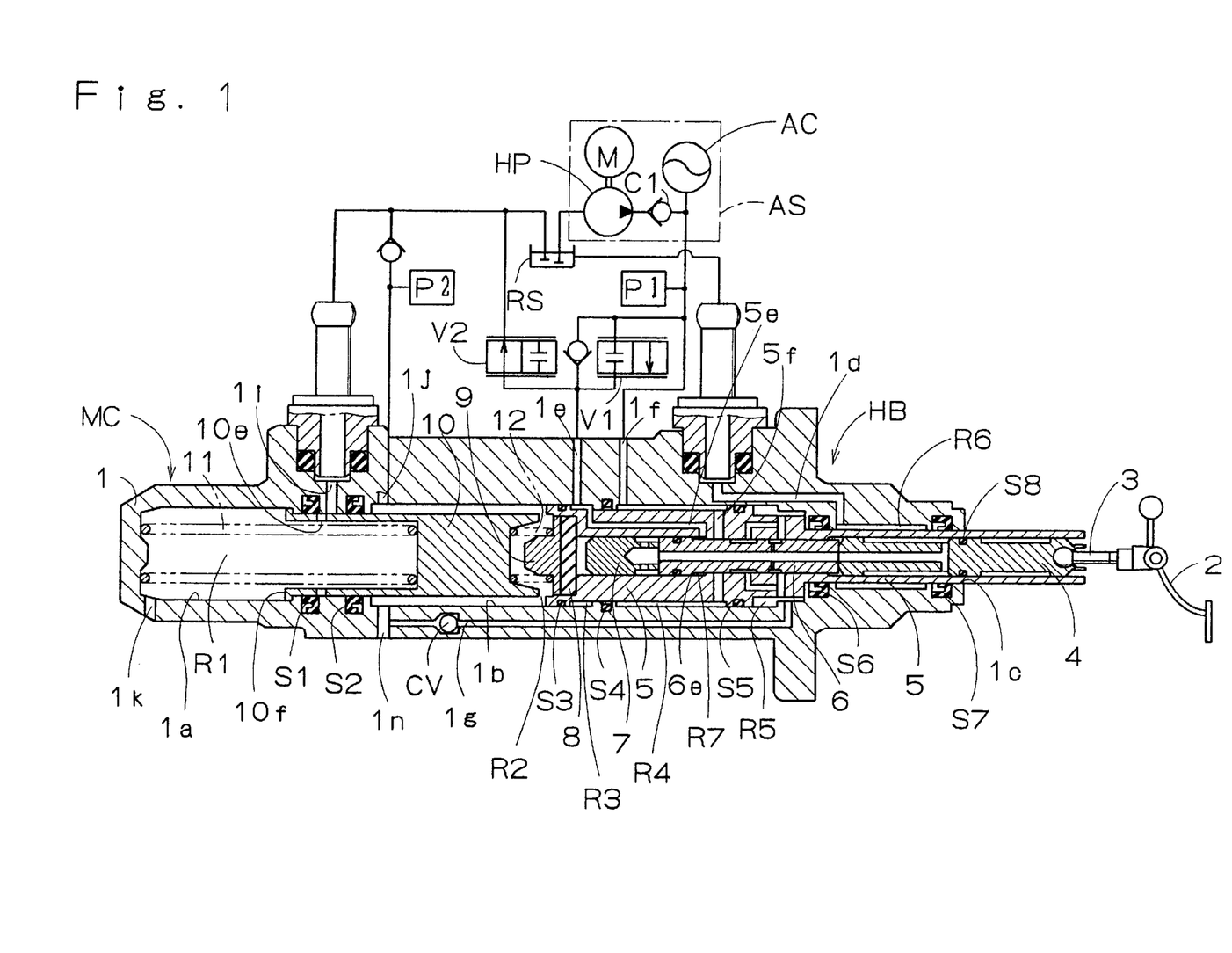
FIG. 1 illustrates an embodiment of a hydraulic brake apparatus for a vehicle in accordance with the present invention.
Figure 2:
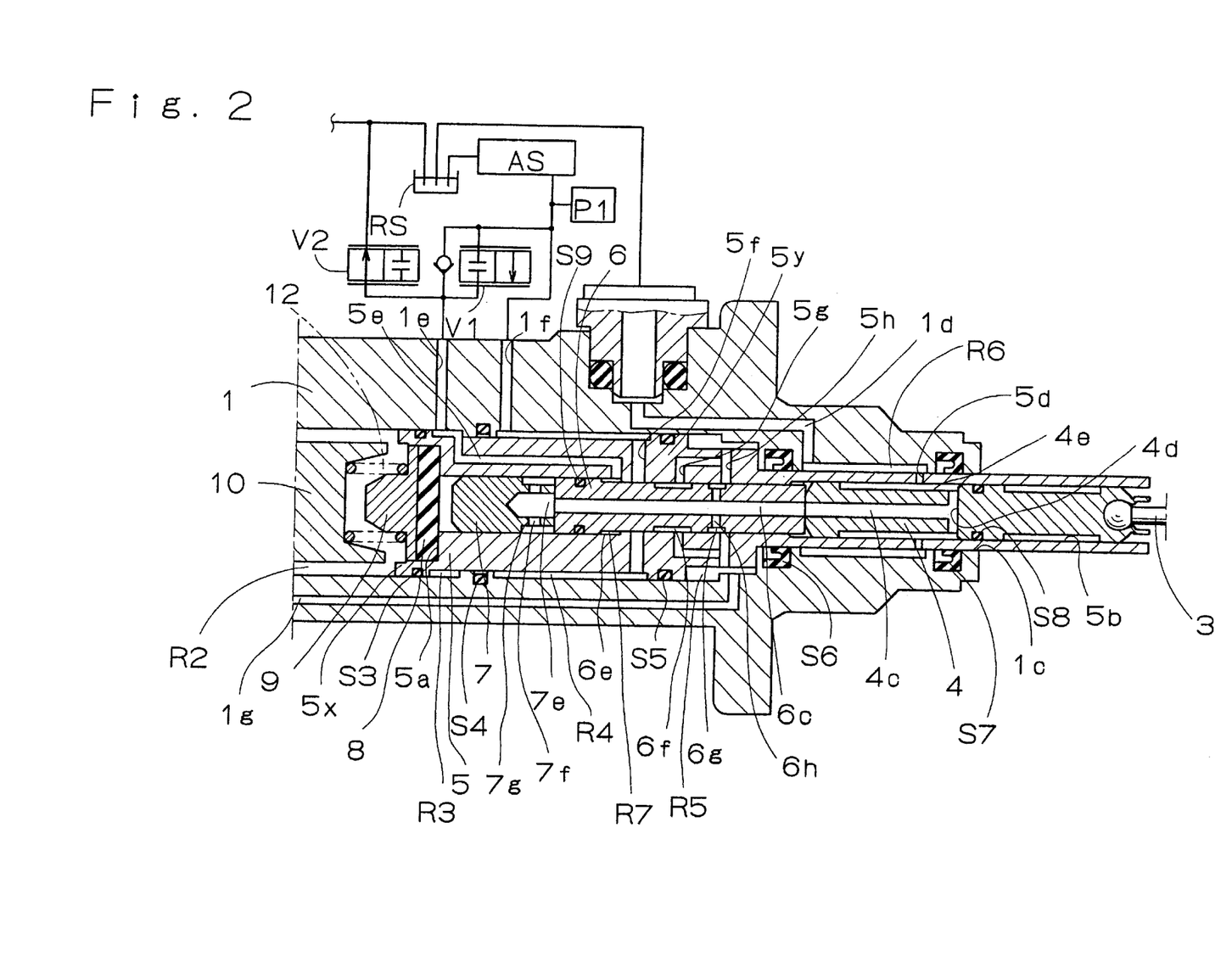
FIG. 2 illustrates a cross-sectional view of a hydraulic pressure-assisting portion of the hydraulic brake apparatus shown in FIG. 1 while no brake operation is made therein.

First of all, referring to FIGS. 1 and 2, there is illustrated a hydraulic brake apparatus for a vehicle which is constructed to apply a brake fluid pressure to each wheel cylinder (not shown) provided on road-wheels (not shown), respectively. When a depression force is applied to a brake pedal 2 the resultant force is transmitted, by way of an input rod 3, to a hydraulic pressure assisting portion HP and correspondingly boosted. The brake fluid pressure is thereby output from a master cylinder which is in fluid communication with the wheel cylinders. It is to be noted that FIG. 1 illustrates an overall structure of the hydraulic brake apparatus, and FIG. 2 illustrates an enlarged structure of the hydraulic pressure assisting portion HP when the hydraulic brake apparatus is at its initial position (i.e. at rest).

As can be seen from FIG. 1, the hydraulic brake apparatus includes a housing 1 formed with a cylinder bore 1a and a cylinder bore 1b which is larger in diameter than the cylinder bore 1a. In the cylinder bores 1a and 1b, there are slidably fitted a master piston 10 and a power piston 5, respectively which are arranged in series. The housing 1 is formed therein with a fluid-supply port 1i, a fluid-supply port 1j, an output port 1k, and an output port in. The output port 1k and the output port in are in fluid communication with a first pressure chamber R1 and a second pressure chamber R2, respectively, which will be described later. The output port 1k and the output port in are also in fluid communication with the wheel cylinders (not shown) of front wheels and with the wheel cylinders (not shown) of rear wheels, respectively.

In a front side of the housing 1, a pair of axially spaced cup-shaped rubber sealing members S1 and S2 are accommodated. The sealing members S1, S2 support the master piston 10 in the housing 1 in a slidable and fluid-tight fashion. At a front side of the master piston 10, a first pressure chamber R1 is formed. At a rear side of the master piston 10, the power piston 5 is supported by a rear side opening 1c of the housing 1 in a slidable and fluid tight fashion. A second pressure chamber R2 is thereby defined between the master piston 10 and the power piston 5.

As illustrated in FIG. 1, a compressed spring 11 is interposed between a distal end wall of the housing 1 and a bottom of a concavity of the master piston 10. The spring 11 urges the master piston 10 in a rearward direction. At a distal end of the master piston 10, an outward-bent engaging portion 10f is formed. The portion 10f is in interlocking engagement with a stepped portion formed inside the housing 1. A rear end position of the master piston 10 is thereby restricted. The master piston 10 is configured to form a hole 10e, for a supply port 1i, in its skirt portion. When the master piston 10 is at rest or at its rear end position, the first pressure chamber R1 is in fluid communication with a reservoir RS.

On the other hand, as depicted in FIG.2, the power piston 5 has a pair of axially spaced, integral front and rear lands 5x and 5y which are provided therein with rubber sealing members S3 and S5, respectively. Inside the housing 1, there is provided a rubber sealing member S4 which is placed between the front sealing member S3 and the rear sealing member S5. In addition, inside the rearward side of the housing 1, a pair of axially spaced cup-shaped rubber sealing members S6 and S7 are fixedly provided. The sealing members S6 and S7, an inner surface of the housing 1, and an outer surface of the power piston 5 define an annular chamber R6. It is to be noted that for actual production of the above-described device, the housing 1 is constructed from plural cylinders and the power piston 5 is divided into two pieces. The housing 1 and the power piston 5 are each illustrated as a one-piece element for easy understanding of the concept of the invention.

Between the sealing members S2 and S3, between the sealing members S3 and SS, and between the sealing members S5 and S6, the second pressure chamber R2, an annular chamber R3, an annular chamber R4, and a power chamber R5 are defined. The power piston 5 has a front concavity 5a and a subsequent or continual stepped hollow portion 5b. The power piston 5 is formed therein with holes 5e, 5f, 5g, 5h, and 5d through which the hollow portion 5b is brought into fluid communication with the annular chamber R3, the annular chamber R4, the power chamber R5, and the annular chamber R6, respectively.

In a rearward portion of the hollow portion 5b, an input member 4 is slidably fitted in fluid-tight fashion via rubber sealing member S8. A rearward end of the input member 4 is coupled with an input rod 3 via a ball joint. In the input member 4, there are formed an axially extending hole 4c and a radially extending hole 4d which are in fluid communication. The hole 4d is in fluid communication with a drain port 1d by way of an annular groove 4e, the hole 5d of the power piston 5, and the annular chamber R6. In the stepped hollow portion 5b, at a frontward side of the input member 4, a spool 6 is slidably fitted in fluid-tight fashion by means of a sealing member S9. At a frontward side of the spool 4, a plunger 7 is slidable fitted. A reaction rubber disc 8 is accommodated or inserted in the concavity 5a of power piston 5. The rubber disc 8 acts as an elastic member for reaction force transmission. A frontward side of the reaction rubber disc 8 is in abutment with a pressure receiving member 9. A spring 12 is disposed between the reaction rubber disc 8 and the pressure receiving member 9 for establishing a direct force transmission therebetween. It is to be noted that when the apparatus is at rest, as shown in FIGS. 1 and 2, a slight clearance is formed between the reaction rubber disc 8 and a distal end surface (i.e. frontward end surface) of the plunger 7.

As illustrated in FIG. 2 in a scale-enlarged drawing, the spool 6 is formed therein with an axially extended hole 6c. The spool 6 is formed at its outer surface with a stepped portion 6e. An outer surface of a smaller diameter portion of the spool 6 is formed with annular grooves 6f and 6g. Moreover, the spool 6 is formed with a radially extending hole 6h through which the hole 6c is in fluid communication with the annular groove 6g. While the apparatus is at rest as shown in FIG. 2, the annular grooves 6f and 6g are in opposition to openings of the holes 5g and 5h, respectively and the power chamber R5 is in fluid communication with the hole 6c by way of the annular groove 6g and the hole 6h. When the spool 6 is advanced or is moved in the leftward direction, the fluid communication is interrupted between the power chamber RS and the hole 6c and the annular groove 6f is brought into opposition to the openings of the respective holes 5f and 5g, thereby establishing a fluid communication between the power chamber R5 and the input port 1f. A hydraulic pressure introduction chamber R7 is defined at a rearward side of the stepped portion 6e of the spool 6 in the power piston 5. A hydraulic pressure or brake fluid pressure is introduced into the chamber R7. The hydraulic pressure or brake fluid pressure is output from an auxiliary hydraulic pressure source AS upon an automatic brake operation. In addition, between a rear end of the spool 6 and the input member 4 there is defined a hydraulic chamber which is in fluid communication with the reservoir RS. The hydraulic chamber is isolated from the hydraulic pressure introduction chamber R7.

The plunger 7 is formed at its outer surface with an annular groove 7g. The plunger 7 is formed therein with an axially extending bore 7e which also opens in the rearward direction to be in opposition to the opening of the hole 6c of the spool 6. The bore 7e of the plunger 7 is in fluid communication with the annular groove 7g by way of the radially extended hole 7f. A space, in which the plunger 7 is accommodated or placed, is in fluid communication with the drain port 1d by way of the hole 6c of the spool 6, the hole 4c, the hole 4d, the annular groove 4e of the spool 6, the hole 5d of the power piston 5, and the annular chamber R6.

The housing 1 is formed at its rearward portion with input ports 1e and 1f and drain port 1d. The drain port 1d is connected to the reservoir RS via fluid communication. The input ports 1e and 1f are in fluid communication with the auxiliary hydraulic pressure source AS. The input port 1e is exposed or opened to the annular chamber R3 to be in fluid communication with the auxiliary hydraulic pressure source AS by way of a normally open electromagnetic valve V1 and with the reservoir RS by way of a normally closed electromagnetic valve V2. The normally open electromagnetic valve V1 and the normally closed electromagnetic valve V2 are in the form of linear solenoid valves. Both the normally open electromagnetic valve V1 and the normally closed electromagnetic valve V2 disclosed in the present embodiment constitute an electromagnetic valve device of the present invention.

The auxiliary hydraulic pressure source AS includes, as shown in FIG. 1, a hydraulic pressure pump HP which is driven by an electric motor M. An input side of the auxiliary hydraulic pressure source AS is in fluid communication with the reservoir RS. An output side of the auxiliary hydraulic pressure source AS is in fluid communication with an accumulator AC by way of a one-way or check valve C1, is in fluid communication with the input port 1f of the housing 1, and is in fluid communication with the input port 1e of the housing 1 by way of the electromagnetic valve V1. In the present embodiment, for making the hydraulic pressure output from the auxiliary hydraulic pressure source AS a fixed value, a pressure sensor P1 is connected to the accumulator AC for constantly monitoring the pressure hydraulic pressure output from auxiliary hydraulic pressure source AS. It is to be noted that another pressure sensor P2 is used for monitoring a hydraulic pressure in the second pressure chamber R2 which is regarded as an output hydraulic pressure of the master cylinder MC.

Moreover, in the present embodiment, the housing 1 is formed therein with a passage 1g which establishes a fluid communication between the second pressure chamber R2 and the power chamber R5. The passage 1g is provided therein with a normally open differential-pressure responsive check valve CV (hereinafter simply referred as check valve). That is to say, normally, the fluid communication between the second pressure chamber R2 and the power chamber is maintained. Depending upon a pressure difference therebetween, the check valve is closed to interrupt the fluid communication between the power chamber R5 and the second chamber R2 when the pressure in the power chamber R5 is greater than the pressure in the second pressure chamber R2 by a predetermined value. On the other hand, when the apparatus is at rest, the check valve is in an open position or is opened due to the fact that there is no pressure difference between the power chamber R5 and the second pressure chamber R2. Thus, it possible to introduce the brake fluid into the second chamber R2 from the reservoir RS by way of the supply port 1j if an evacuation is performed at a side of the power chamber R5. Therefore, an easy way of bleeding air from the second pressure chamber R2 is established.

Next how the hydraulic brake apparatus having the aforementioned structure operates will be described in detail. At first, if the brake pedal 2 is not depressed, each element takes the position as shown in FIGS. 1 and 2. The electromagnetic valve V1 and the electromagnetic valve V2 are in a closed position and an open position, respectively. The hydraulic pressure assistance portion HB is not in operation or at rest. Under such a state, though the annular chamber R4 is in fluid communication with the accumulator AC of the auxiliary hydraulic pressure source AS, the hole 5f is closed by the spool 6. In addition, the power chamber R5 is in fluid communication with the reservoir RS by way of the hole 5h, the groove 6g of the spool 6 which opposes thereto, the hole 6h of the spool 6, the hole 6c of the spool 6, the hole 4c of the input member 4, the hole 4d of the input member 4, the annular groove 4e, the hole 5d of the power piston 5, the annular chamber R6, and the drain port 1d. Moreover, the power chamber R5 is in fluid communication with the second pressure chamber R2 by way of the passage 1g and the check valve CV. Even if the auxiliary hydraulic pressure source AS is driven or is brought into operation, the power piston 5 receives only the rearward force resulting from the hydraulic pressure in the annular chamber R4. The rest position illustrated in each of FIGS. 1 and 2 remains unchanged.

When a brake operation is initiated or the brake pedal 2 is depressed, the resulting advancing movement of the input member 4 causes the spool 6 to advance or move in the leftward direction. The spool 6 therefore closes the hole 5h of the power piston 5, thereby interrupting the fluid communication between the power chamber R5 and the hole 6c. The annular groove 6f is brought into opposition to the hole 5f. The annular groove 6f, and the hole 5g, thereby introduces the power hydraulic pressure in the power chamber R5 by way of the input port 1f, the hole 5f, the annular groove 6f, the hole 5g, and the hole 5h. At this time, the input port 1e is in fluid communication with the hydraulic pressure introduction chamber R7 at the rearward side of the stepped portion 6e of the spool 6 by way of the annular chamber R3 and the hole 5e. The electromagnetic valve V1 is at the closed position and the input port 1e is in fluid communication with the reservoir RS by way of the electromagnetic valve V2 which is at the open position. The spool 6 is therefore driven depending on the advancing movement of the input member 4 or the depression of the brake pedal 2 (i.e. brake pedal operation). Then, the differential pressure between the power chamber R5 and the second pressure chamber R2 is in excess of the predetermined value. Therefore, the check valve CV is closed, which results in the second pressure chamber R2 which is filled with the brake fluid being closed or sealed.

Thus, during assisting operation which is initiated after the second pressure chamber R2 is confined, the urging force applied to the front end surface of the power piston 5 from the pressure in the second pressure chamber R2 is controlled to balance with the brake operation force and the urging force applied to the rear end surface of the power piston. Due to the fact that the power piston 5 is larger than the master piston 10 in effective area within the second pressure chamber R2, as the power piston 5 advances the master piston 10 advances. Thus, the distance between the master piston 10 and the power piston 5 expands (similar to the FIG. 3-illustrated state), which causes the master piston 10 and the power piston 5, which are fluidly coupling, to move as one unit. Thus, during assisting operation which is performed by the hydraulic assistance portion HB, the power piston 5 and the master piston 10 are brought into fluidic coupling with each other via the brake fluid filled within the second pressure chamber R2. This causes the power piston 5 and the master piston 10 to advance as one unit in such a manner that the master piston 10 advances by an amount corresponding to the gap or clearance between the power piston 5 and the master piston 10, thereby shortening the depression stroke of the brake pedal 2.

Figure 4:
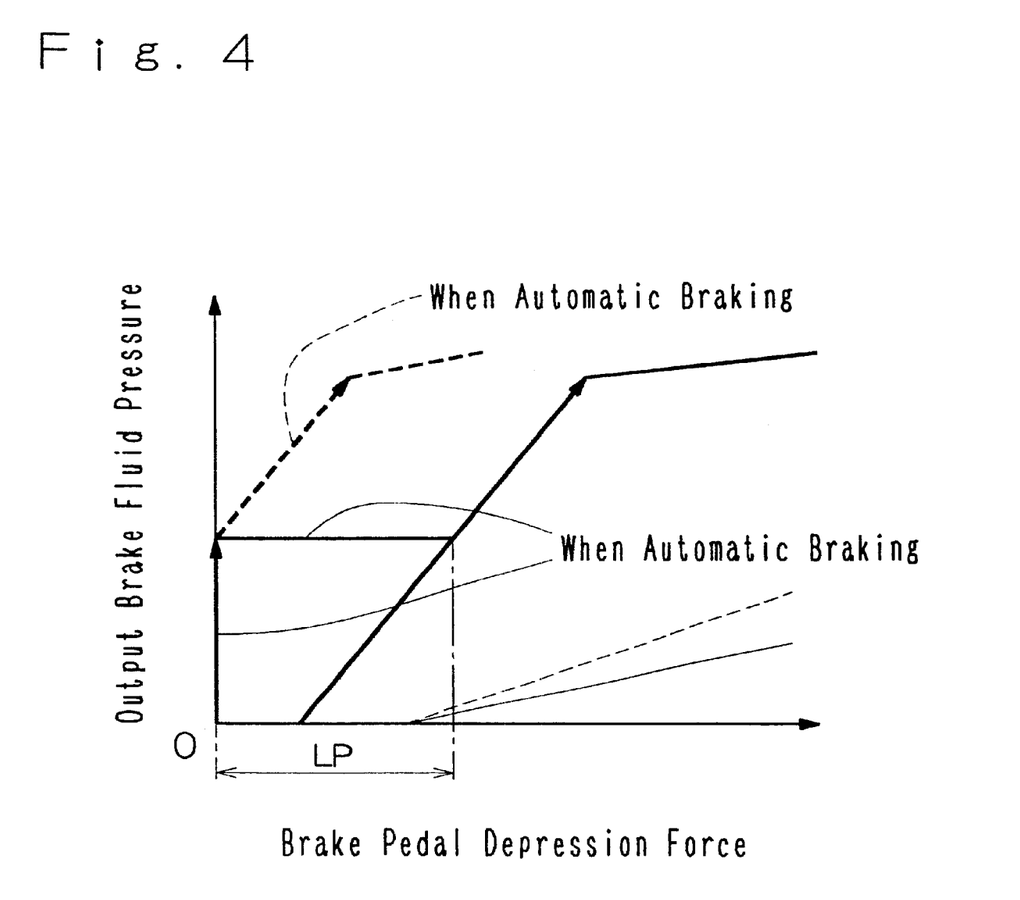
FIG. 4 illustrates a graph which is representative of the hydraulic pressure characteristic resulting from the hydraulic brake apparatus shown in FIG. 1 during automatic operation, when compared to the conventional operation.

On the other hand, during failure of the hydraulic assistance portion HB, no power hydraulic pressure can be applied to the annular chamber R4 and the power chamber R5. Therefore, the inside of the annular chamber R3 and the inside of the second pressure chamber R2 are brought to atmospheric pressure level due to the annular chamber R3 being in fluid communication with the reservoir RS by way of the input port 1e. The second pressure chamber R2 is also in fluid communication with the reservoir RS by way of the passage 1g and the power chamber R5. Thus, when the input rod 3 is advanced depending on the depression stroke of the brake pedal 2, the input member 4 and the spool 6 cause the plunger 7 to engage with the reaction force rubber disc 8. This urges the master piston 10 by way of the reaction force rubber disc 8, the pressure receiving member 9, and the spring 12, thereby advancing these elements as one unit. Due to the unitary advancing movements of the power piston 5 and the master piston 10, the resultant output brake fluid pressure does not depend on the effective area of the power piston 5, but upon the effective area of the master piston 10. Thus, the pressure-increase inclination upon failure of the hydraulic assistance portion HB becomes steeper as indicated by a thin dot line located at a right-lower portion in the graph illustrated in FIG. 4 than the characteristics of the power piston 5, but the effective area of the master piston 10 and the master piston 5 are equal in effective area which is indicated by a thin solid line located at a right-lower portion in FIG. 4.

Figure 3:
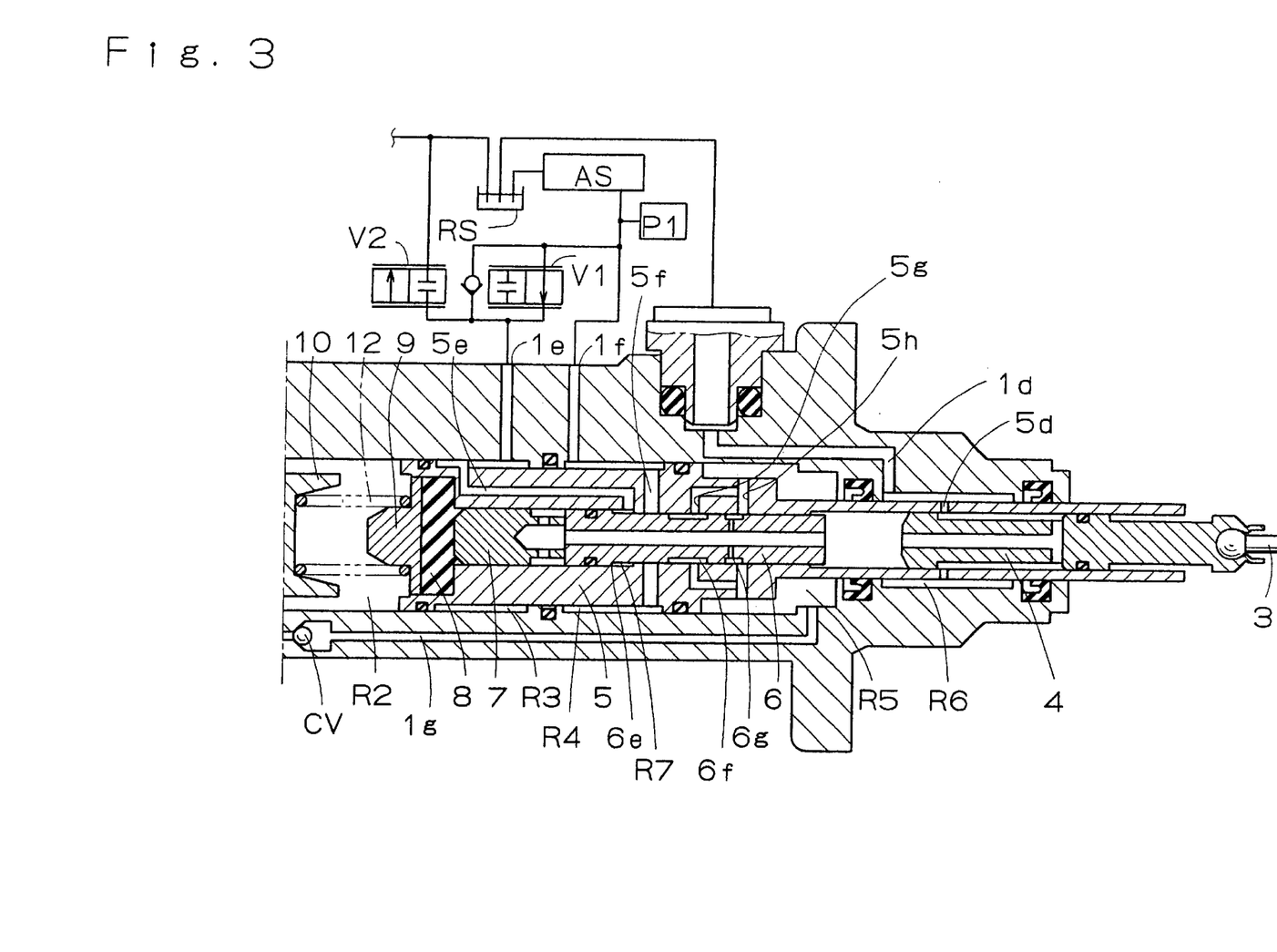
FIG. 3 illustrates a cross-sectional view of a hydraulic pressure-assisting portion of the hydraulic brake apparatus shown in FIG. 1 during automatic brake operation.

In addition, in the present embodiment, as will be described hereinbelow, an active brake operation (i.e. automatic brake operation) can be performed. If the automatic operation is initiated when the brake pedal 2 is not depressed (though the illustration of the brake pedal 2 is omitted in each of FIGS. 2 and 3), the initial position of each element just after this initiation is similar to that in FIG. 2 except that the electromagnetic valve V1 is placed in an open position, the electromagnetic valve V2 is placed in a closed position, and the auxiliary hydraulic pressure source AS is driven, as shown in FIG. 3. That is, the hole 5f is closed by the spool 6 since the positions of the spool 6 and the plunger 7 are similar to those in FIG. 2. The hydraulic pressure output from the auxiliary hydraulic pressure chamber AS is introduced into the hydraulic pressure introduction chamber R7 at the rearward side of the stepped portion 6e of the spool 6 by way of the hole 5e and the input port 1e, which causes the spool 6 to advance, thereby establishing the FIG. 3-illustrated state. Then, the power chamber R5 is in fluid communication with the auxiliary hydraulic pressure source AS by way of the hole 5g, the annular groove 6f opposing thereto, the hole 5f, and the input port if. This drives the power piston 5 and the master piston 10 to advance, thereby applying the brake fluid pressure to the wheel cylinder of each of the road-wheels.

In such a case, since the differential pressure between the power chamber R5 and the second pressure chamber R2 closes the check valve CV and interrupts the passage 1g, the second pressure chamber R2 which is filled with the brake fluid is confined. Thus, the master piston 10 is brought into advancement due to the urging force from the brake fluid pressure which is introduced into the power chamber R5 and applied by the effective area of the power piston 5. Thus, when the brake pedal 2 is at rest or is not brought into depression, controlling the auxiliary hydraulic pressure source AS, the electromagnetic valve V1, and the electromagnetic valve V2 makes it possible to output the brake fluid pressure in a suitable manner. Meanwhile, since the frontward side of the input member 4 is in fluid communication with the reservoir RS by way of the drain port 1d, despite the brake fluid pressure in the second pressure chamber R2 being applied to the pressure receiving member 9 and the reaction rubber disc 8, the reaction force is not transmitted or applied to the input member 4 and is opposed by the hydraulic pressure output from the auxiliary hydraulic pressure source AS which is applied to the power piston 5.

Moreover, the output hydraulic pressure introduced from the auxiliary hydraulic pressure source AS into the hydraulic pressure introduction chamber R7 can not be transmitted, as a reaction force, to the input member 4 since the hydraulic pressure introduction chamber R7 into which the hydraulic pressure is introduced from the auxiliary hydraulic pressure source AS is defined between the stepped portion 6e of the spool 6 and the power piston 5 and is isolated from the frontward side chamber of the input member 4.

Thus, when the apparatus is in the state illustrate in FIG. 3, if the brake pedal 2 (which is not illustrated in FIG. 3) is depressed, the input member 4 is advanced without restriction and is brought into engagement with the rear end surface of the spool 6. If the input member 4 is further advanced, the resulting depression force is transmitted to the second pressure chamber R2 by way of the spool 6, the plunger 7, and the reaction rubber disc 8, thereby increasing the pressure in the second pressure chamber R2. This results in the characteristics depicted in a bold dot line at left-upper portion of FIG. 4. Thus, it is possible to use an immediate brake pedal depression force for braking. This is contrary to the conventional manner wherein an operation force (indicated by 'LP' in FIG. 4) is unnecessary for canceling the reaction force from the automatic brake operation which was valid before the brake pedal depression. Thus, good brake pedal feeling can be obtained.

As explained above, in the hydraulic brake apparatus, the inner simple structure thereof makes it possible to shorten the depression stroke of the brake pedal 2. In particular, even if the brake pedal 2 is depressed during automatic brake operation, an immediate usage of the resulting brake pedal depression force is possible for braking, thereby making the braking force adequate without sacrificing good brake feeling. In addition, an immediate detection of the brake pedal depression during automatic brake operation is made possible, thereby enabling to shift another control very quickly.

In the present embodiment, during automatic brake operation, the hydraulic pressure output from the auxiliary hydraulic pressure source AS is applied to the rearward side of the stepped portion 6e of the spool 6. However, instead of the auxiliary hydraulic pressure source AS, a separate pressure source such as a pump can apply output hydraulic pressure to the rearward side of the stepped portion 6e of the spool 6.

In the present embodiment, the spool 6 and its related elements constitute the valve device which is used for supplying the hydraulic pressure to the pressure adjusting device and this spool 6 is driven by hydraulic pressure during automatic brake operation. However, a poppet valve (not shown) which is driven by hydraulic pressure can be used instead as the valve device. In such a case, forming a stepped portion on a valve body of the poppet valve which is similar to the stepped portion 6e makes it possible to define, between the stepped portion and the power piston 5, a hydraulic pressure introduction chamber (not shown) which is similar to the hydraulic pressure introduction chamber R7 and which is isolated from the frontward side of the input member 4. Thus, it is possible to prevent a transmission of the reaction force to the input member upon automatic brake operation by employing a structure wherein, in the pressure adjusting device, the stepped portion is formed on the valve body such as the spool or the poppet valve and the hydraulic pressure chamber, such as the chamber R7, is exposed to the stepped portion and is isolated from the chamber at the frontward side of the input member.

The present invention is constructed as explained above provides the following advantages. In accordance with the first aspect of the present invention, the valve device and the driving device are provided in the hydraulic brake apparatus. The valve device is provided in the power piston and establishes, depending on at least the operation of the brake operation member, a changeover between a first position at which the power chamber is pressurized at atmospheric pressure and a second position at which the power chamber is brought into fluid communication with the auxiliary hydraulic pressure source. The driving device hydraulically drives the valve device, independent of the operation of the brake operation member. When applied with hydraulic pressure, the driving device switches the valve device to the second position, and urges the power piston to advance, without transmitting the resultant force to the brake operation member. The power piston is advanced against a reaction force which is applied to the power piston from the hydraulic pressure output from the master cylinder. The driving device, when applied with no hydraulic pressure, retains the valve device at the first position. Thus, even if the brake operation member is operated while automatic brake operation is being performed, the braking force can be increased with a brake feeling which is similar to that during the normal brake operation. The brake pedal operation during automatic brake operation can therefore be recognized immediately.

In the second aspect and third aspect of the present invention, the valve device and the driving device can be in the form of spools, respectively. Therefore when the brake operation member is operated in association with such a simple structure during automatic braking, a braking force can be increased immediately without disturbing the brake feeling.

If the hydraulic pressure output from the auxiliary pressure source is employed as the hydraulic pressure applied to the driving device in the fourth aspect of the present invention and if the hydraulic pressure output from the auxiliary pressure source to the driving device is regulated by the electromagnetic valves in the fifth aspect of the present invention, it is possible to easily perform an automatic brake operation and to immediately increase the braking force without disturbing the brake feeling.

The invention has thus been shown and description with reference to specific embodiments. However, it should be understood that the invention is in no way limited to the details of the illustrates structures but changes and modifications may be made without departing from the spirit and scope of the appended claims.

What is claimed is:

1. A hydraulic brake apparatus for a vehicle comprising:
   a master cylinder advancing a master piston, depending on an operation of a brake operation member, to increase a pressure of a brake fluid supplied from a brake fluid reservoir and outputting a resultant brake fluid as a brake fluid pressure;
   a power piston placed at a rearward portion of the master piston to define a power chamber, the power piston being advanced by a hydraulic pressure in the power chamber in order to advance the master piston;
   an auxiliary hydraulic pressure source for outputting a power hydraulic pressure by increasing the pressure of the brake fluid supplied from the brake fluid reservoir; and
   a pressure adjusting device connected to the auxiliary hydraulic pressure source and to the brake fluid reservoir, the pressure adjusting device adjusting the power hydraulic pressure to a predetermined value which is output from the auxiliary hydraulic pressure source, and supplying the adjusted power hydraulic pressure to the power chamber, the pressure adjusting device including a valve device and a driving device, the valve device being provided in the power piston and establishing, depending on at least the operation of the brake operation member, a changeover between a first position at which the power chamber is pressurized at atmospheric pressure and a second position at which the power chamber is brought into fluid communication with the auxiliary hydraulic pressure source, the driving device hydraulically driving the valve device, independent of the operation of the brake operation member, the driving device, when applied with hydraulic pressure, switching the valve device to the second position, and urging the power piston to advance, without transmitting the resultant force to the brake operation member, the power piston being advanced against a reaction force to the power piston from the hydraulic pressure output from the master cylinder, the driving device, when applied with no hydraulic pressure, retaining the valve device at the first position.

2. The hydraulic brake apparatus as set forth in claim 1, wherein the valve device includes a spool which is movable in an axial direction in the power piston, the power chamber is constructed to be in fluid communication with the auxiliary pressure source and the brake fluid reservoir when the spool is in advancing and retracting positions, respectively, relative to the power piston, the spool is advanced when the driving device is applied with hydraulic pressure.

3. The hydraulic brake apparatus as set forth in claim 2, wherein the driving device is in the form of a stepped portion formed at an outer surface of the spool, the stepped portion being constructed such that a rearward side of the stepped portion receives a hydraulic pressure in the power piston.

4. The hydraulic brake apparatus as set forth in claim 1, wherein the hydraulic pressure to be applied to the driving device is a hydraulic pressure output from the auxiliary hydraulic pressure source.

5. The hydraulic brake apparatus as set forth in claim 4, wherein an electromagnetic valve device is disposed between the auxiliary hydraulic pressure source and the driving device, the electromagnetic valve device regulates the hydraulic pressure a desired pressure value, which is to be applied to the driving device from the auxiliary hydraulic pressure source.

6. The hydraulic brake apparatus as set forth in claim 1, wherein the master piston and the power piston are accommodated in a cylinder, the cylinder is provided therein with a passage which establishes a fluid communication between the power chamber and a pressure chamber defined between the master piston and the power piston, the passage being provided therein with a normally open differential-pressure responsive valve which is closed depending on a pressure increase in the power chamber.

7. The hydraulic brake apparatus as set forth in claim 3 further comprising an input member and a reaction disc, the input member being moved in the power piston at a rearward side of the spool for transmitting the operation of the brake operation member to the spool, the reaction disc disposed in the power piston at a frontward side of the spool for transmitting a reaction force from the master piston to the spool when the brake operation member is operated.

8. The hydraulic brake apparatus as set forth in claim 7 further comprising a plunger which is slidably placed between the spool and the reaction disc, the plunger being accommodated in a space which is in fluid communication with the brake fluid reservoir.

9. A hydraulic brake apparatus for a vehicle comprising:

a reservoir containing a brake fluid;

an auxiliary hydraulic pressure source for generating a power hydraulic pressure independently of an operation of a brake operation member;

a master cylinder operable in response to the operation of the brake operation member, the master cylinder generating a hydraulic brake pressure to be supplied to a wheel cylinder for applying a brake torque to a road wheel of the vehicle;

a power piston for operating the master cylinder by a hydraulic pressure in a power chamber; and a pressure adjusting device for controlling a communication between the power chamber and the auxiliary hydraulic pressure source and for controlling a communication between the power chamber and the reservoir to adjust the hydraulic pressure in the power chamber in response to the operation of the brake operation member, the pressure adjusting device including a valve device disposed in the power piston and operatively connected to the brake operation member, the pressure adjusting device further including a hydraulic actuating device disposed between the power piston and the valve device for actuating the valve device independently of an operation of a brake operation member, the valve device being disconnected from the brake operation member upon operation of the valve device by the hydraulic actuating device.

10. The hydraulic brake apparatus as set forth in claim 9, wherein the valve device includes a spool which is movable in an axial direction in the power piston, the power chamber is constructed to be in fluid communication with the auxiliary pressure source and the brake fluid reservoir when the spool is in advancing and retracting positions, respectively, relative to the power piston, the spool is advanced when the hydraulic actuating device is applied with hydraulic pressure.

11. The hydraulic brake apparatus as set forth in claim 10, wherein the hydraulic actuating device is in the form of a stepped portion formed at an outer surface of the spool, the stepped portion being constructed such that a rearward side of the stepped portion receives a hydraulic pressure in the power piston.

12. The hydraulic brake apparatus as set forth in claim 9, wherein the hydraulic pressure to be applied to the hydraulic actuating device is a hydraulic pressure output from the auxiliary hydraulic pressure source.

13. The hydraulic brake apparatus as set forth in claim 12, wherein an electromagnetic valve device is disposed between the auxiliary hydraulic pressure source and the hydraulic actuating device, the electromagnetic valve device regulates the hydraulic pressure a desired pressure value, which is to be applied to the hydraulic actuating device from the auxiliary hydraulic pressure source.

14. The hydraulic brake apparatus as set forth in claim 9, wherein the master piston and the power piston are accommodated in a cylinder, the cylinder is provided therein with a passage which establishes a fluid communication between the power chamber and a pressure chamber defined between the master piston and the power piston, the passage being provided therein with a normally open differential-pressure responsive valve which is closed depending on a pressure increase in the power chamber.

15. The hydraulic brake apparatus as set forth in claim 11 further comprising an input member and a reaction disc, the input member being moved in the power piston at a rearward side of the spool for transmitting the operation of the brake operation member to the spool, the reaction disc disposed in the power piston at a frontward side of the spool for transmitting a reaction force from the master piston to the spool when the brake operation member is operated.

16. The hydraulic brake apparatus as set forth in claim 15 further comprising a plunger which is slidably placed between the spool and the reaction disc, the plunger being accommodated in a space which is in fluid communication with the brake fluid reservoir.

* * * * *